US012550890B2

(12) United States Patent
Shelton et al.

(10) Patent No.: US 12,550,890 B2
(45) Date of Patent: Feb. 17, 2026

(54) SYSTEM AND METHOD FOR MAINTAINING ORGAN VIABILITY

(71) Applicant: United Therapeutics Corporation, Silver Spring, MD (US)

(72) Inventors: Randolph Vernon Monteiro Shelton, Washington, DC (US); Jeffrey Robert SooHoo, Chapel Hill, NC (US); Simone Julie Gregor, Durham, NC (US)

(73) Assignee: United Therapeutics Corporation, Silver Spring, MD (US)

( * ) Notice: Subject to any disclaimer, the term of this patent is extended or adjusted under 35 U.S.C. 154(b) by 614 days.

(21) Appl. No.: 17/890,059

(22) Filed: Aug. 17, 2022

(65) Prior Publication Data

US 2023/0059208 A1   Feb. 23, 2023

Related U.S. Application Data

(60) Provisional application No. 63/234,563, filed on Aug. 18, 2021.

(51) Int. Cl.
*A01N 1/143*   (2025.01)
*A01N 1/142*   (2025.01)
(Continued)

(52) U.S. Cl.
CPC ............. *A01N 1/143* (2025.01); *A01N 1/148* (2025.01); *A01N 1/142* (2025.01); *A01N 1/144* (2025.01);
(Continued)

(58) Field of Classification Search
CPC ........ A01N 1/148; A01N 1/143; A01N 1/165; A01N 1/146; A01N 1/142; C12N 5/0602
See application file for complete search history.

(56) References Cited

U.S. PATENT DOCUMENTS

2005/0153271 A1*   7/2005   Wenrich ................... A01N 1/10
                                                             435/1.1
2012/0315618 A1*  12/2012   Kravitz .................. A01N 1/143
                                                             435/1.1
(Continued)

FOREIGN PATENT DOCUMENTS

WO   WO-2017/205967 A1   12/2017
WO   WO-2021/011663 A1    1/2021

OTHER PUBLICATIONS

Slebos et al. Safety and Histological Effect of Liquid Nitrogen Metered Spray Cryotherapy in the Lung. American Journal of Respiratory and Critical Care Medicine (2017), 196(10), 1351-1652. (Year: 2017).*

(Continued)

*Primary Examiner* — Sean C. Barron
(74) *Attorney, Agent, or Firm* — Foley & Lardner LLP

(57) ABSTRACT

A system comprises a fluid supply, a pressure regulator, a pressure valve, and a vent assembly. The fluid supply stores a volume of a fluid and is fluidly coupled to an outlet tube. The outlet tube is configured to be fluidly coupled to at least a portion of an organ environment. The organ environment configured to hold an organ. The pressure regulator is fluidly coupled to the outlet tube and is configured to maintain a fluid pressure of the fluid being supplied to the organ environment from the outlet tube. The fluid being supplied is at a pressure range above ambient to maintain the organ in an inflated position. The pressure valve is fluidly coupled to the outlet tube and inhibits increase of the fluid pressure above a threshold. The vent assembly removes excess fluid from the organ environment and includes a vent tube disposed within the organ environment and a vent valve disposed outside of the organ environment.

15 Claims, 8 Drawing Sheets

(51) Int. Cl.
  *A01N 1/144* (2025.01)
  *A01N 1/146* (2025.01)
  *A01N 1/148* (2025.01)
  *A01N 1/165* (2025.01)
  *C12N 5/071* (2010.01)

(52) U.S. Cl.
  CPC .............. *A01N 1/146* (2025.01); *A01N 1/165* (2025.01); *C12N 5/0602* (2013.01)

(56) References Cited

U.S. PATENT DOCUMENTS

2018/0055042 A1* 3/2018 Sarmentero Ortiz .. A01N 1/125
2021/0235691 A1 8/2021 Collette et al.

OTHER PUBLICATIONS

Paragonix Technologies, "LUNGguard," Jan. 6, 2021, 1-12.

* cited by examiner

SYSTEM AND METHOD FOR MAINTAINING ORGAN VIABILITY

CROSS-REFERENCE TO RELATED APPLICATIONS

This application claims priority to U.S. Provisional Application No. 63/234,563, filed Aug. 18, 2021, which is incorporated by reference it its entirety.

TECHNICAL FIELD

The present disclosure relates generally to the field of maintaining viability of organs during transport or storage.

BACKGROUND

For organs prepared for transport, it is desirable to maintain the viability and health of the organ during the time the organ is being transported. One approach is static cold storage in which an organ is placed into a cooler and surrounded by ice to maintain the organ temperature. However, this approach may lead to various pressure changes leading to hypoinflation and hyperinflation of the organ or organ cavities, which could lead to organ damage. These changes in pressure may be due to leaks within the organ or change in pressure outside of the organ. The organ damage may lead to worse patient outcomes, early mortality, or non-viability of the organ.

SUMMARY

One embodiment relates to a system. The system comprises a fluid supply, a pressure regulator, and a pressure valve. The fluid supply is configured to contain a volume of a fluid and is fluidly coupled to an outlet tube. The outlet tube is configured to be coupled to at least a portion of an organ environment. The organ environment configured to hold an organ. The pressure regulator is coupled to the outlet tube and is configured to maintain a fluid pressure of the fluid being supplied to the organ environment from the outlet tube. The fluid being supplied is at a pressure range so as to maintain the organ in an inflated position. The pressure valve is fluidly coupled to the outlet tube and is configured to inhibit increase of the fluid pressure above a threshold. In some embodiments, the system includes a vent assembly configured to remove excess fluid from the transport container. The vent assembly includes a vent tube and/or valve disposed within the organ environment and an outlet disposed outside of the organ environment.

One embodiment relates to a method. The method includes providing a system which includes a fluid supply, an outlet tube, and a pressure regulator. The fluid supply is configured to contain a volume of a fluid. The outlet tube is configured to be fluidly coupled to the fluid supply. The pressure regulator is coupled to the outlet tube. The pressure valve is coupled to the outlet tube. The method includes disposing of at least a portion of an organ into the organ environment and fluidly coupling a first end of the outlet tube to at least a portion of the organ environment. The pressure regulator is adjusted to provide the fluid to the organ through the outlet tube at a fluid pressure range so as to maintain the organ in an inflated position. In some embodiments, the method includes providing a system that further includes a vent assembly. The vent assembly includes a vent tube and/or valve disposed within the organ environment and an outlet disposed outside of the organ environment.

Another embodiment relates to a system. The system includes a controller, a fluid supply, a condenser, and a fluid supply line. The fluid supply is coupled to the controller and configured to contain a volume of a fluid. The condenser is coupled to the controller and fluidly coupled to the fluid supply. The controller operates the fluid supply to the condenser and the condenser condenses the fluid. The fluid supply line is fluidly coupled at a first end to the condenser and fluidly coupled at a distal end to at least a portion of an organ environment. In some embodiments, the system may include a pressure valve and a pressure regulator. The pressure valve is fluidly coupled to the fluid supply line and configured to inhibit increase of the fluid pressure above a threshold. The pressure regulator is fluidly coupled to the fluid supply line and configured to maintain a fluid pressure of the fluid being supplied to the organ environment from the fluid supply line at a fluid pressure above ambient so as to maintain the organ in an inflated position.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
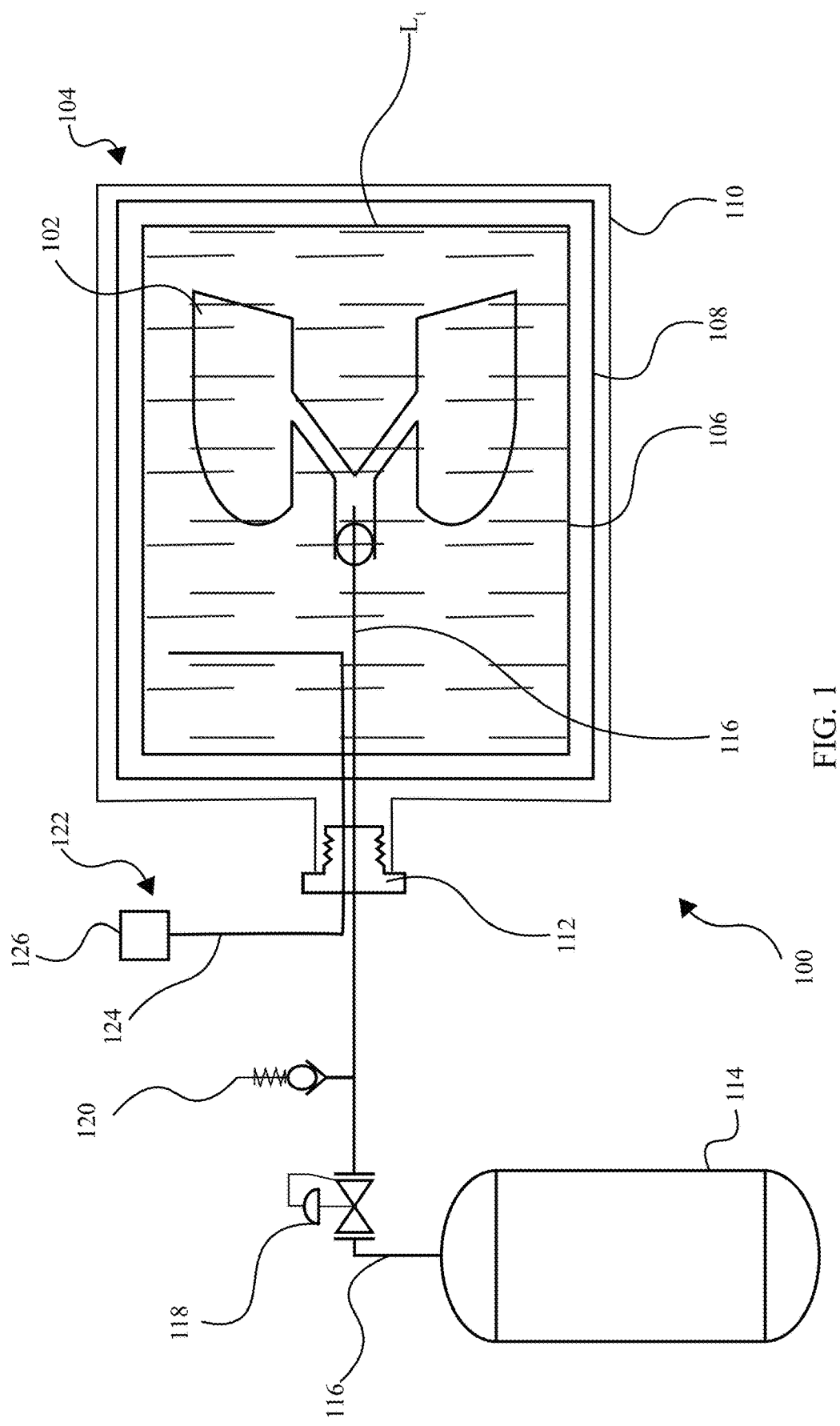
FIG. 1 is a schematic illustration of an example system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for maintaining viability of organs during transport and/or storage, and in particular, providing fluid at an ideal pressure range to at least a portion of an organ to maintain appropriate pressure of the organ while being transported or stored. As used herein, "organ" can refer to an entire organ or portions of an organ, such as a lobe of a lung.

Organs or portions of organs utilized for transplants, educational purposes, research, or inspection as to transplant viability are often transported from excision site to the site where the organ or portion thereof is intended to be utilized. One example is ex vivo lung perfusion where lungs or portions of lungs are perfused ex vivo and monitored to determine whether they are suitable for use in transplantation. Typically, organs are stored in static cold storage during transport, e.g., packed in a cooler with ice. Preservation solutions may be used, and the vasculature or other openings of the organs (e.g., airways in the lung) may be clamped or cannulated. There are no active measures to maintain physiological or other desired pressures. In some cases, the organs may not be initially inflated at the time of procurement depending on the procurement personnel. The organs may be transported via ground transport or air transport. During ground transport, there is a possibility of hypoinflation where the organ is under inflated, which may occur due to possible leaks in the organ or portion thereof. During air transport, the organ may experience: 1) hypoinflation due to leaks or 2) hyperinflation, which is over-inflation of the organ due to pressure changes during transport. Hyperinflation and/or hypoinflation may lead to increased edema, microvascular injury, worsened gas exchange, tissue damage during restoration of blood flow to the organ, and in some cases may reduce or extinguish the viability of the organ or portion thereof, during transport. In some cases, the damage to the organ may lead to harmful outcomes to an organ recipient.

In contrast, the systems and method for maintaining viability as described herein, which include inflating the organ at an ideal pressure range, may provide one or more benefits including, such as: (1) regulation of the pressure inside an organ or portion thereof to limit hyperinflation and hypoinflation, (2) inflating an organ at a pressure above ambient during transportation, (3) providing a disposable system that reduces chances of introducing bacteria or other infectious agents from a previous use, (4) preventing deflation of organs, and (5) providing correction of operator discrepancies when handling the organ.

Referring to FIG. 1, a system 100 is shown according to some embodiments. The system 100 is used maintain the viability and prevent damage to an organ (e.g., lung, kidney, liver, etc.) during transport. In some embodiments, the system 100 is used to maintain viability and prevent damage to at least a portion of an organ (e.g., lung lobes, etc.) that is being transported. The system 100 generally provides a fluid (e.g., gas, liquid, air, oxygen, air/oxygen mixture, etc.) to the organ or at least a portion of the organ (e.g., lung lobes, etc.) to assist in maintaining viability of the organ or the at least portion of the organ. The system 100 may include an organ 102. In some embodiments, the organ 102 may be an extracted organ from a human patient, for example, a lung. In some embodiments, the organ 102 may be a non-human derived organ (e.g., a 3D printed organ, a grafted organ, a synthetic organ, a xeno organ, etc.). In some embodiments, the system 100 may include only a portion of the organ 102 (e.g., a lung lobe, a liver lobe, a vascular section, a digestive section, etc.).

The organ 102 is disposed within organ environment 104. In some embodiments, the organ environment 104 is sterile. The organ environment 104 includes at least one organ bag 106 (e.g., lung bag, etc.). In some embodiments, the organ bag 106 is sterile. The organ bag 106 is configured to receive and store the organ 102 for transport. Here, the organ 102 may be stored in the organ bag 106, to prevent contaminants (e.g., bacteria, viruses, etc.) from interacting with and possibly damaging the organ 102. The organ bag 106 may be formed from plastic and may undergo processing (e.g., chemical processing, steam processing, radiation processing, etc.) so as to remove possible contaminants and bacteria prior to disposing an organ 102 within the organ bag 106. In some embodiments, the organ bag 106 receives an organ stabilizing fluid $L_1$ (e.g., electrolyte preservation solution, low potassium dextran, intracellular preservation solution, pharmacological agents, biological agents, etc.). The organ stabilizing fluid $L_1$ is configured to preserve the organ 102 while the organ 102 is stored in the organ bag 106. In some embodiments, the organ bag 106 containing the organ 102, and the organ stabilizing fluid $L_1$, is disposed within at least a second organ bag 108. In some embodiments, the second organ bag 108 is sterile. The second organ bag 108 may be structurally similar to the organ bag 106. In some embodiments, the second organ bag 108 containing the organ bag 106 that includes the organ 102 and the organ stabilizing fluid $L_1$ are disposed within at least a third organ bag 110, that may be structurally similar to the organ bag 106 and/or the second organ bag 108. In some embodiments, the third organ bag 110 is sterile. Having multiple organ bags may provide the advantage of redundancy such that if one of the organ bags 106, 108, or 110 fails (e.g., is punctured or ruptured), the other organ bag 106, 108, and/or 110 still prevent the fluid from leaking and/or maintain an organ environment around the organ 102. Moreover, the multiple organ bags 106, 108, 110 may also inhibit heat transfer from the organ 102. In some embodiments, the bags 106, 108, and/or 110 may be replaced with some other container, such as a box.

The system 100 includes an organ environment manifold 112. The organ environment manifold 112 is configured to seal the organ bag 106 from the outside environment and prevent fluid from leaking within the organ environment 104. In some embodiments, the organ environment manifold 112 is configured to seal the organ bag 106. In some embodiments, the organ environment manifold 112 is configured to seal the organ bag 106 and the second organ bag 108. In some embodiments, the organ environment manifold 112 is configured to seal the organ bag 106, the second organ bag 108, and the third organ bag 110. The organ environment manifold 112 facilitates regulation of pressure within the organ bag 106, as described herein. In some embodiments, the organ environment manifold 112 may be built into the first organ bag 106. In some embodiments, organ environment manifold 112 may be built into the second organ bag 108. In some embodiments, organ environment manifold 112 may be built into the third organ bag 110. In some embodiments, the organ environment manifold 112 may be built into a combination of the first organ bag 106 and the second organ bag 108. In some embodiments, the organ environment manifold 112 may be built into a combination of the first organ bag 106, the second organ bag 108, and the third organ bag 110. In some embodiments, there is not an organ environment manifold.

The system 100 includes a fluid supply 114. The fluid supply 114 is configured to store a volume of fluid. In some embodiments, the fluid supply 114 is a compressed gas tank. In some embodiments, the fluid supply 114 may be a gas condenser. In some embodiments, the fluid supply 114 stores a gas that stored may be air, oxygen, nitrogen, or combinations thereof. In some embodiments, the fluid supply 114 stores a gas comprising approximately (e.g., within 5% of being, etc.) 50% of oxygen and approximately 50% of air. In some embodiments, the fluid supply 114 stores a gas comprising approximately 40%-60% of oxygen and the remaining gas (40%-60%) air. In some embodiments, the fluid supply 114 stores a gas comprising approximately 25% oxygen and approximately 75% air. In some embodiments, the fluid supply 114 stores a gas comprising approximately 75% oxygen and approximately 25% air. In some embodiments, the fluid supply 114 stores a gas comprising 100% oxygen. In some embodiments the fluid supply 114 stores a pharmacological agent in combination with the gas. In some embodiments, the system 100 may include the fluid supply 114 that is configured to store a liquid (e.g., compressed liquid, saline, electrolyte preservation solution, low potassium preservation solutions, synthetic blood, blood substitutes, perfluorocarbon, etc.). In some embodiments, the system 100 may include multiple fluid supplies, such as a first fluid supply configured to store a gas and a second fluid supply configured to store a liquid (e.g., air to maintain the pressure in the airways of a lung and a liquid to maintain the pressure in the vasculature of the lung).

The system 100 includes an outlet tube 116. The outlet tube 116 is configured to receive the fluid from the fluid supply 114. In some embodiments, the outlet tube 116 may be a conduit (e.g., pipe, a tube, a hose, etc.). The outlet tube 116 may also be fluidly coupled to the fluid supply 114. The outlet tube 116 may also be coupled (e.g., attached, affixed, adhesively attached, bonded, fluidly, electrically, etc.) to the fluid supply 114. The outlet tube 116 is fluidly coupled to the organ 102 at a distal end. The outlet tube 116 may also be coupled to the organ at a distal end. In some embodiments, the outlet tube is fluidly coupled to an organ connector which is fluidly coupled to the organ. Specifically, the outlet tube 116 is fluidly coupled to the fluid supply 114 at one end and extends from the fluid supply 114 through the organ environment manifold 112 and fluidly couples to the organ 102. As the outlet tube 116 extends through the organ environment manifold 112, the organ environment manifold 112 is configured to seal the space around the outer portion of the outlet tube 116 as to prevent any leaks of fluid from within the organ bag 106. The organ environment manifold 112 may utilize a seal (e.g., gasket, elastomer rubber seal, etc.), to prevent leaks from within the organ bag 106. In some embodiments, the system 100 includes multiple fluid supplies and each fluid supply can have a separate outlet tube, and the fluid supplies can be fluidly coupled to different portions of an organ, e.g., airways and vasculature. Each fluid supply may operate substantially the same as fluid supply 114, such as each fluid supply having its own outlet tube, pressure regulatory, pressure valve, etc.

In some embodiments where the fluid within the fluid supply 114 is a liquid and the fluid supply 114 may include a container for containing the liquid. In such embodiments, a pump (not shown), for example, a rotary pump, a positive-displacement pump, an axial flow pump, etc. may be fluidly coupled to the fluid supply 114 and receives the fluid from the fluid supply 114. The pump is configured to pressurize the fluid received from the fluid supply 114 and facilitate flow of the pressurized fluid into the outlet tube 116. In some embodiments, the pump may replace the fluid supply 114 and/or a pressure regulator, as described herein. In some embodiments, the pump pressurizes the fluid in a range between approximately 3 mmHg to approximately 50 mmHg (2.85 mmHg, 3 mmHg, 5 mmHg, 10 mmHg, 15 mmHg, 20 mmHg, 25 mmHg, 30 mmHg, 35 mmHg, 40 mmHg, 45 mmHg, 50 mmHg, 52.5 mmHg, etc.). As used herein, a range of X to Y includes X, Y, values between X and Y, and values approximately equal to X and approximately equal to Y. In some embodiments, a return line may be provided from the organ bag 106 to the fluid supply to allow recirculation of the fluid form the organ bag 106 to the fluid supply 114. In some embodiments, the pump pressurizes the fluid at a vascular pressure of the organ. In some embodiments, the pump is configured to pressurize the fluid to an organ in a range between approximately 3 mmHg to approximately 20 mmHg, when the organ is a lung. In some embodiments, the pump is configured to pressurize the fluid to an organ in a range between approximately 10 mmHg to approximately 20 mmHg, when the organ is a kidney. In some embodiments, the pump is configured to pressurize the fluid to an organ in a range between approximately 3 mmHg to approximately 50 mmHg, when the organ is a liver.

The outlet tube 116 is configured to provide the fluid from the fluid supply 114 to the organ 102. In some embodiments, the fluid facilitates inflation of the organ 102 while being stored during transportation. Moreover, the fluid may maintain oxygenation of the organ 102 and keep the organ 102 hydrated and keep the organ 102 supplied with nutrients, pharmacological agents, or biological agents. In embodiments in which the fluid includes a gas, the fluid provided from the fluid supply 114 to the organ 102 by the outlet tube 116 may be pressurized in a range between approximately 8 $cmH_2O$ and approximately 20 $cmH_2O$ above the ambient air pressure (hereinafter "above ambient"), inclusive (e.g., 7.6 $cmH_2O$, 8 $cmH_2O$, 10 $cmH_2O$, 12 $cmH_2O$, 14 $cmH_2O$, 16 $cmH_2O$, 18 $cmH_2O$, 20 $cmH_2O$, 21 $cmH_2O$, etc.). In some embodiments, the fluid may be pressurized in a range between approximately 12 $cmH_2O$ and approximately 15 $cmH_2O$, above the ambient air pressure, inclusive.

In some embodiments, the system 100 includes a pressure regulator 118. The pressure regulator 118 is fluidly coupled to the outlet tube 116. In some embodiments, the pressure regulator 118 is coupled directly to the fluid supply 114 (e.g., a gas supply). The pressure regulator 118 is configured to provide a fluid to an organ 102 via the outlet tube 116. In some embodiments, the pressure regulator 118 may be a valve (e.g., a positive end-expiratory pressure (PEEP) valve, check valve, pressure relief valve, fast-acting valve, etc.). In some embodiments, the pressure regulator 118 may be an operated valve (e.g., gate valve, pinch valve, ball valve, butterfly valve, solenoid valve, pneumatic valve, etc.), that may be controlled by an external device. Specifically, the pressure regulator 118 is set to a pressure threshold value and is configured to provide the fluid from fluid supply 114 to the outlet tube 116 at the pressure threshold. For example, the pressure regulator 118 is set to a pressure threshold value and facilitates flow of the fluid from the fluid supply 114 to the outlet tube 116 at the pressure threshold value. In some embodiments, the pressure regulator 118 facilitates flow of the fluid with a pressure greater than the pressure threshold value. In some embodiments, the pressure threshold value that the pressure regulator 118 may be set to is in a range between approximately 8 $cmH_2O$ and approximately 14 $cmH_2O$ above ambient, inclusive (e.g., 7.6 $cmH_2O$, 8 $cmH_2O$, 10 $cmH_2O$, 12 $cmH_2O$, 14 $cmH_2O$, 14.7 $cmH_2O$, etc.). In an example embodiment, if the pressure regulator 118 is set to a pressure threshold value of 12$cmH_2O$, the fluid being provided from the pressure regulator 118 to the outlet tube 116 has a pressure of at least 12$cmH_2O$.

The fluid then flows from the pressure regulator 118 into the outlet tube 116 towards the organ 102. A pressure valve 120 is fluidly coupled to the outlet tube 116. In some embodiments, the pressure valve 120 is fluidly coupled to the outlet tube between the organ bag 106 and the pressure regulator 118. The pressure valve 120 is configured to inhibit pressure increase in the fluid between the pressure regulator 118 and the pressure valve 120 by opening the pressure valve 120 and releasing a portion of the fluid being communicated from the fluid supply 114 once the pressure increases beyond a pressure threshold. In some embodiments, the pressure valve 120 is configured to inhibit pressure increase in the fluid by opening the pressure valve 120 and releasing a portion of the fluid within the outlet tube 116. In some embodiments, the pressure valve 120 is configured to inhibit pressure increase in the fluid by opening the pressure valve 120 and releasing a portion of the fluid within the organ 102 via the outlet tube 116. The pressure valve threshold may be in a range between approximately 14 cmH$_2$O and approximately 20 cmH$_2$O above ambient, inclusive (e.g., 13.3 cmH$_2$O, 14 cmH$_2$O, 16 cmH$_2$O, 18 cmH$_2$O, 20 cmH$_2$O, 21 cmH$_2$O, etc.). In operation, as the fluid flows within the outlet tube 116 towards the pressure valve 120, the fluid pressure may increase due to the pressure of the surrounding environment. When the fluid reaches the pressure valve 120, the pressure valve 120 may be forced open due to the increase in pressure to the fluid beyond the pressure threshold. Once the fluid pressure is equal to or below the pressure threshold value, the pressure valve 120 closes to prevent more fluid from flowing out. In an example embodiment, the pressure valve 120 may be set to a pressure threshold value of approximately 15 cmH$_2$O. The environment may cause the fluid pressure within the outlet tube 116 to increase above 15 cmH$_2$O (e.g., to 17 cmH$_2$O, etc.). As the fluid flows by the pressure valve 120, the pressure valve 120 is opened by the excess pressure and allows a portion of the fluid to be vented into the environment through the pressure valve 120. Once the fluid pressure decreases to 15 cmH$_2$O, the pressure valve 120 closes. The fluid then flows within the outlet tube 116 to the organ 102. In some embodiments, the pressure within the organ 102 may be greater than the pressure valve threshold. This may cause the pressure valve 120 to be forced open to release the excess pressure such that the pressure within the organ 102 decreases to the pressure valve threshold. In some embodiments, the pressure within the organ 102 decreases below the pressure valve threshold.

In some embodiments, as the organ 102 receives the fluid, the pressure within the organ environment 104 increases. The organ 102 may also have physical damage which may result in leaks of fluid causing the fluid to exit the organ 102 and enter the organ environment 104. Due to the organ bag 106 being sealed within the organ environment 104, the pressure within the organ environment 104 increases which may lead to organ damage. To regulate the pressure within the organ environment 104, the system 100, in some embodiments, includes a vent assembly 122. The vent assembly 122 includes a vent tube 124. The vent tube 124 extends through the organ environment manifold 112 and is positioned within the organ bag 106. The vent tube 124 is configured to facilitate a flow of a fluid within the organ bag 106 to the environment. Specifically, the vent assembly 122 includes a vent valve 126. The vent valve 126 is fluidly coupled to the vent tube 124 and is configured to receive the fluid from the organ environment via the vent tube 124. The vent valve 126 is set to a pressure threshold approximately in a range between 1 cmH$_2$O to 5 cmH$_2$O, inclusive (e.g., 0.95 cmH$_2$O, 1 cmH$_2$O, 2 cmH$_2$O, 3 cmH$_2$O, 4 cmH$_2$O, 5 cmH$_2$O, 5.25 cmH$_2$O, etc.). In some embodiments, the vent valve 126 may be set to a low-pressure threshold so as to keep the organ in an inflated state. In operation, the vent valve 126 is forced open by the fluid if the fluid exceeds the pressure threshold set on the vent valve 126.

Figure 2:
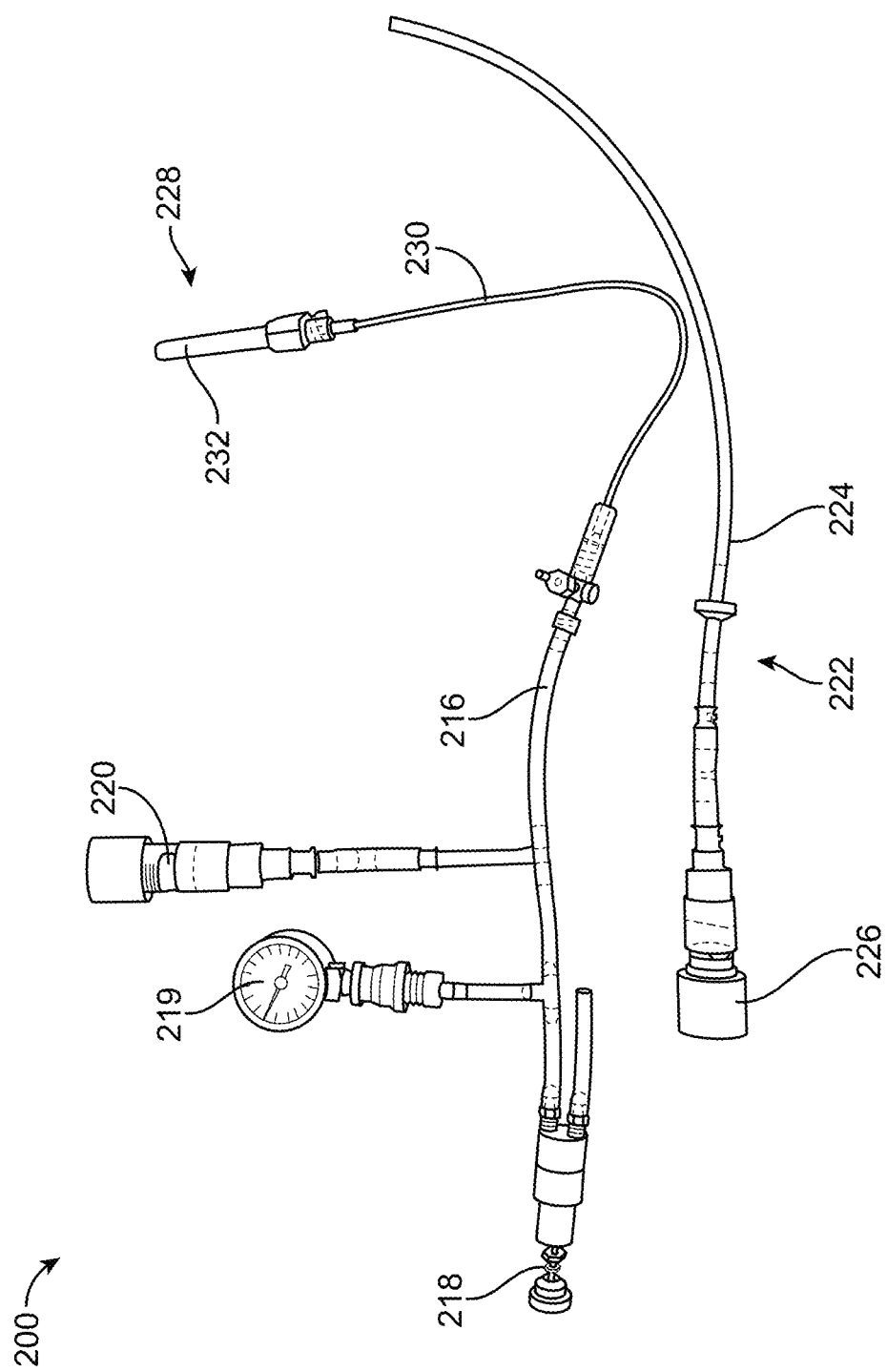
FIG. 2 is a perspective view of the system, according to one embodiment.

FIG. 2 is a perspective view of a system 200, according to one embodiment. The system 200 includes an outlet tube 216 and a pressure regulator 218. The pressure regulator 218 is substantially similar to the pressure regulator 118. The system 200 further includes a pressure gauge 219. The pressure gauge 219 is configured to measure the pressure of the fluid within the outlet tube and display the pressure within the outlet tube 216. In some embodiments, the pressure gauge 219 may be a digital pressure gauge. The pressure gauge 219 is configured so as to verify that the pressure of the fluid within the outlet tube 216 is in a range between approximately 8 cmH$_2$O and approximately 14 cmH$_2$O above ambient, inclusive (e.g., 7.6 cmH$_2$O, 8 cmH$_2$O, 10 cmH$_2$O, 12 cmH$_2$O, 14 cmH$_2$O, 14.7 cmH$_2$O, etc.). For example, if the pressure regulator 218 is defected and is not providing pressurized fluid, the pressure gauge 219 may read a pressure less than approximately 8 cmH$_2$O. The system 200 includes a pressure valve 220 and a vent assembly 222. The vent assembly 222 includes a vent tube 224 and vent valve 226. The pressure regulator 218, the pressure valve 220, the vent assembly 222 including the vent tube 224 and the vent valve 226 are substantially similar to the pressure regulator 118, the pressure valve 120, the vent assembly 122 including the vent tube 124 and the vent valve 126, respectively, and therefore not described in further detail herein.

The outlet tube 216 of the system 200 is configured to receive the fluid from a fluid supply (not shown). In some embodiments, the outlet tube 216 receives the fluid once the fluid passes through the pressure regulator 218. The outlet tube 216 extends from the fluid supply to an organ connector assembly 228 and is coupled thereof. Specifically, the organ connector assembly 228 is fluidly coupled to the outlet tube 216 at a distal end.

The organ connector assembly 228 is configured to supply fluid to an organ within an organ environment. In some embodiments, the organ connector assembly 228 is configured to supply fluid to the transport container 104 such that the fluid surrounds the organ. The organ connector assembly 228 includes an organ connector tube 230. The organ connector tube 230 is coupled to the outlet tube 216 and is configured to receive fluid from the outlet tube 216. In some embodiments, the organ connector tube 230 is coupled to the outlet tube 216 so as to prevent a leak of the fluid. In some embodiments, the organ connector tube 230 may include a seal positioned between the organ connector tube 230 and the outlet tube 216 so as to prevent leak of the fluid. The organ connector assembly 228 includes an organ connector 232. The organ connector 232 is coupled to the organ connector tube 230 at one end and receives fluid from the organ connector tube 230. At another end, the organ connector 232 is coupled to an organ (not shown). In some embodiments, the organ connector 232 is coupled to an inlet of the organ. In some embodiments, the organ connector 232 may be a needle. In some embodiments, the organ connector 232 may be a flexible catheter. In operation, the organ connector 232 receives fluid from the organ connector tube 230 and provides the fluid to the organ so as to inflate the organ, oxygenate the organ, and/or hydrate the organ. In some embodiments, the organ connector 232 is coupled with a trachea. In some embodiments, the organ connector 232 is coupled with a mainstem bronchus.

Figure 3:
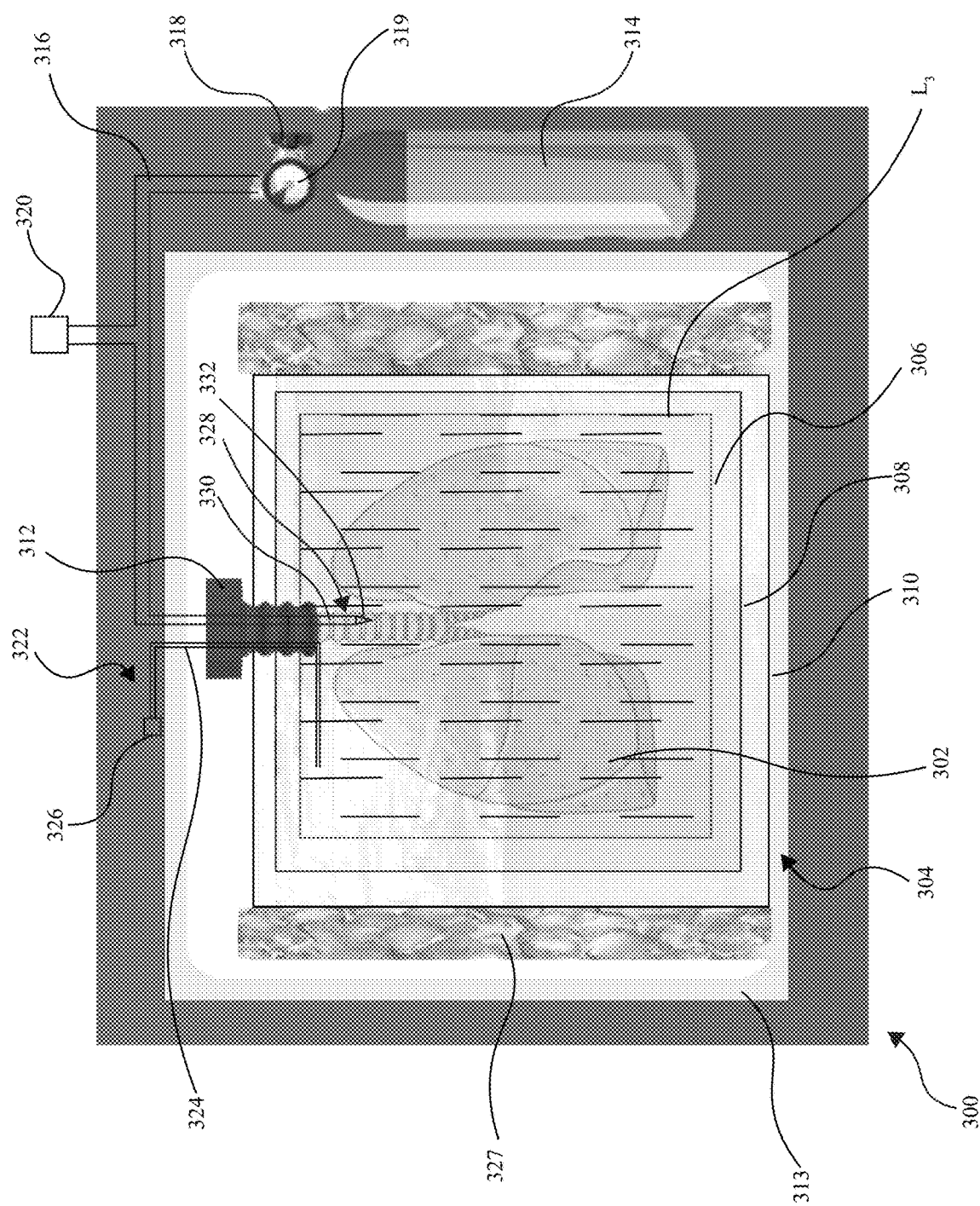
FIG. 3 is a schematic illustration of the system, according to an embodiment.

Referring to FIG. 3, a schematic illustration of a system 300 is depicted. The system 300 includes an organ 302 disposed with an organ stabilizing fluid L$_3$ and an organ environment 304 including at least one organ bag 306. In some embodiments, the organ environment 304 may include a second organ bag 308. In some embodiments, the organ environment 304 may include a third organ bag 310. The system 300 includes an organ environment manifold 312. The organ 302, the organ stabilizing fluid $L_3$, the organ environment 304, the organ bag 306, the second organ bag 308, the third organ bag 310, and the organ environment manifold 312 may be substantially similar to the organ 102, the organ stabilizing fluid $L_1$, the organ environment 104, the organ bag 106, the second organ bag 108, the third organ bag 110, and the organ environment manifold 112, respectively, and therefore are not described in further detail herein.

The system 300 includes a transport container 313. The transport container 313 receives the organ environment 304 including the organ 302 and is configured to protect the organ environment 304 and the organ 302 from external damage. In some embodiments, the transport container 313 is a cooler configured to maintain a temperature of the organ as described herein. In some embodiments, the transport container 313 is the organ environment 304. The transport container 313 may have an inner length approximately in a range of 12 inches (in.) to 24 inches (in.) (e.g., 11.4 in., 12 in., 13 in., 14 in., 15 in., 16 in., 17 in., 18 in., 19 in., 20 in., 21 in., 22 in., 23 in., 24 in., 24.7 in., etc.). The transport container 313 may have an inner width approximately in a range of 10 in. to 16 in. (e.g., 9.6 in., 10 in., 11 in., 12 in., 13 in., 14 in., 15 in., 16.8 in., etc.). In some embodiments, the transport container 313 may have a depth approximately in a range of 10 in. to 16 in. (e.g., 9.2 in., 10 in., 11 in., 12 in., 13 in., 14 in., 15 in., 16 in., 16.6 in., etc.).

The system 300 includes a fluid supply 314, an outlet tube 316, a pressure regulator 318, a pressure gauge 319, a pressure valve 320, and a vent assembly 322 including a vent tube 324 and a vent valve 326. The fluid supply 314, the outlet tube 316, the pressure regulator 318, the pressure valve 320, the vent assembly 322 including the vent tube 324 and the vent valve 326 may be substantially similar to the fluid supply 114, the outlet tube 116, the pressure regulator 118, the pressure gauge 219, the pressure valve 120, and the vent assembly 122 including the vent tube 124 and the vent valve 126, respectively, and therefore not described in further detail herein. In some embodiments, the vent valve 126 may be a filter to maintain sterility.

The system 300 includes a temperature regulator 327 (e.g., ice, dry ice, cooling fluid, phase change material, etc.). The temperature regulator 327 is configured to cool the organ to a temperature range in the range of approximately 0° C. to approximately 10° C., inclusive (e.g., −0.05° C., 0° C., 1° C., 2° C., 3° C., 4° C., 5° C., 6° C., 7°, 8° C., 9° C., 10° C., 12.5° C., etc.). Here, the temperature regulator 327 cools the organ so as reduce metabolism and inhibit cell death within the organ during transport.

The system 300 includes an organ connector assembly 328. The organ connector assembly include an organ connector tube 330 and an organ connector 332. The organ connector assembly 328 including the organ connector tube 330 and the organ connector 332 is substantially similar to the organ connector assembly 228 including the organ connector tube 230 and the organ connector 232, respectively, and therefore not described further in detail herein.

Figure 4:
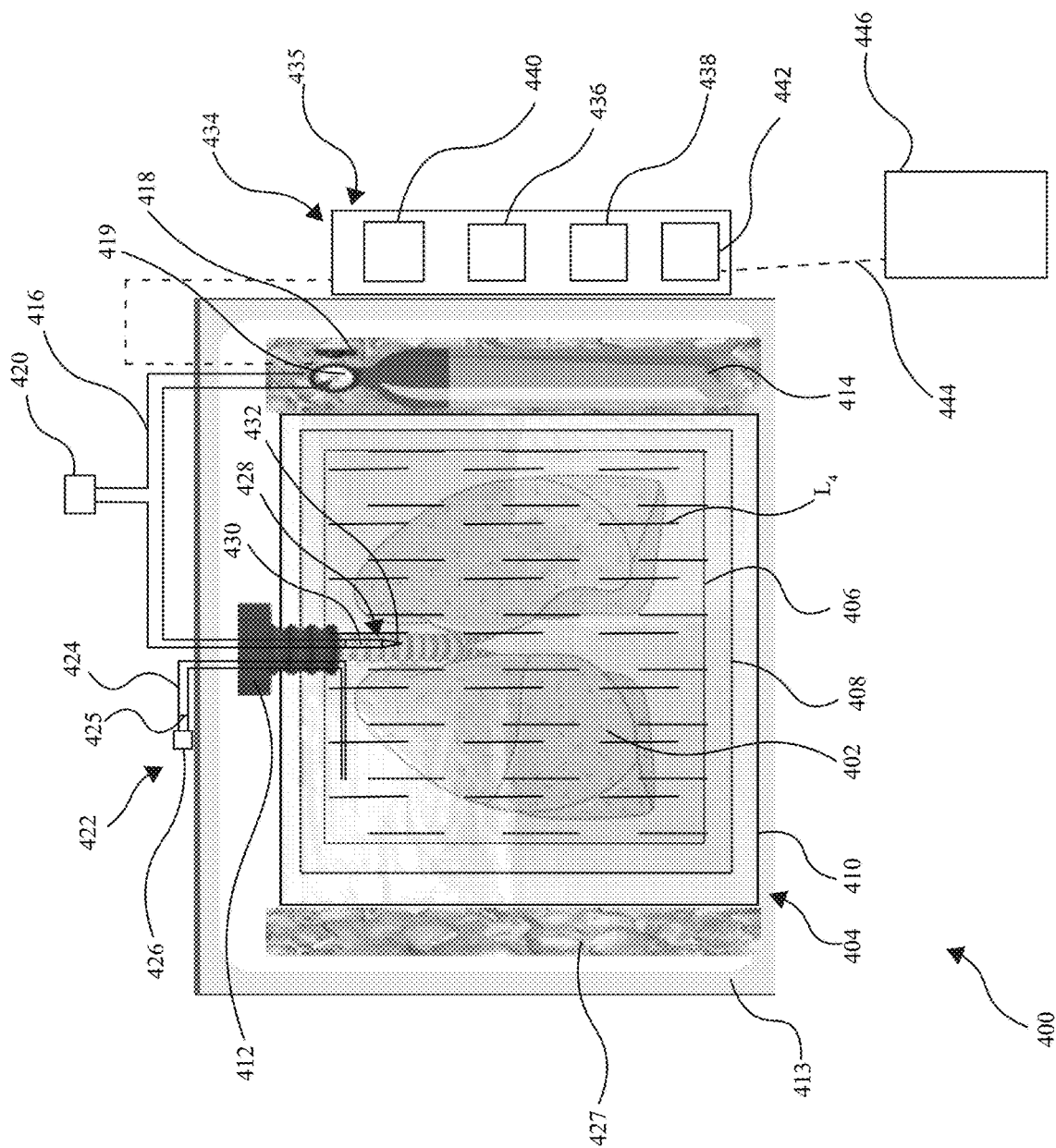
FIG. 4 is a schematic illustration of the system, according to an embodiment.

Referring to FIG. 4, a schematic illustration of a system 400 is depicted. The system 400 includes an organ 402 disposed with an organ stabilizing fluid $L_4$ and an organ environment 404 including at least one organ bag 406. In some embodiments, the organ environment 404 may include a second organ bag 408. In some embodiments, the organ environment 404 may include a third organ bag 410. The system 400 includes an organ environment manifold 412, a transport container 413, an outlet tube 416, a pressure regulator 418, a pressure valve 420, a vent assembly 422 including a vent tube 424, a vent filter 425, and a vent valve 426, a temperature regulator 427, and organ connector assembly 428 including an organ connector tube 430 and an organ connector 432. The organ 402, the organ stabilizing fluid $L_4$, the organ environment 404, the organ bag 406, the second organ bag 408, the third organ bag 410, the organ environment manifold 412, the transport container 413, the organ connector assembly 428 including the organ connector tube 430 and the organ connector 432 are substantially similar to the organ 102, the organ stabilizing fluid $L_1$, the organ environment 104, the organ bag 106, the second organ bag 108, the third organ bag 110, the organ environment manifold 112, the transport container 313, the organ connector assembly 228 including the organ connector tube 230 and the organ connector 232 respectively, and therefore not described further in detail herein.

The system 400 includes a fluid supply 414. The fluid supply 414 is substantially similar to fluid supply 114 in that it is configured to store a fluid and provide the fluid to an organ via the outlet tube 416. In some embodiments, the fluid supply 414 is stored within the transport container 413. Specifically, the fluid supply 414 is stored within the temperature regulator 427 such that the volume of fluid within the fluid supply 414 may be cooled prior to flowing to the organ 402. This allows for additional cooling of the organ 402 which increase the viability of the organ 402 during transport.

Additionally, the system 400 includes a controller 434 (e.g., control circuit, programmable logic board, driver, etc.). The pressure regulator 418 and the pressure gauge 419 is electrically or communicatively coupled to the controller 434. The controller 434 is configured to control the pressure regulator 418 to maintain the fluid pressure at a fluid pressure value in a range between approximately 8 $cmH_2O$ and approximately 20 $cmH_2O$, above ambient, inclusive (e.g., 7.6 $cmH_2O$, 8 $cmH_2O$, 10 $cmH_2O$, 12 $cmH_2O$, 14 $cmH_2O$, 16 $cmH_2O$, 18 $cmH_2O$, 20 $cmH_2O$, 21 $cmH_2O$, etc.). In some embodiments in which the fluid includes a liquid, the controller 434 may be configured to control a pump to control a supply and a pressure of the liquid communicate into the organ.

The controller 434 includes a processing circuit 435. The processing circuit 435 includes a processor 436 and a memory 438. The processor 436 may include a microprocessor, an application-specific integrated circuit (ASIC), a field-programmable gate array (FPGA), etc., or combinations thereof. The memory 438 may include, but is not limited to, electronic, optical, magnetic, or any other storage or transmission device capable of providing a processor, ASIC, FPGA, etc. with program instructions. This memory 438 may include a memory chip, Electrically Erasable Programmable Read-Only Memory (EEPROM), Erasable Programmable Read Only Memory (EPROM), flash memory, or any other suitable memory from which the controller 434 can read instructions. The instructions may include code from any suitable programming language. The memory 438 may include various modules that include instructions that are configured to be implemented by the processor 436. In some embodiments, the memory 438 includes a pressure range for various fluids that may be stored within the fluid supply 414. In some embodiments, the memory 438 includes a temperature range.

In operation, the controller 434 through the processor 436 electrically transmits a command to the pressure gauge 419 to conduct a measurement and obtain a fluid pressure value. The pressure gauge 419 receives the command and obtains the fluid pressure value and transmits the fluid pressure value to the controller 434. The controller 434 through the processor 436 receives fluid pressure value and stores the fluid pressure value on the memory 438. The controller 434 through the processor 436 retrieves the pressure range for the fluid within fluid supply tube 416 and the fluid pressure value from the memory 438 and compares the fluid pressure value to the pressure range. In some embodiments, the controller 434 determines that the fluid pressure value is greater than the upper bound of the pressure range. Here, the controller 434 adjusts the pressure regulator 418 such that the pressure of the fluid is reduced and the pressure valve 420 vents excess pressure such that the pressure of the fluid may be maintained within the pressure range. In some embodiments, the controller 434 may determine that the fluid pressure value is within the pressure range and does not adjust the pressure regulator 418. In some embodiments, the controller 434 may determine that the fluid pressure value is below the lower bound of the pressure range and adjusts the pressure regulator 418 so as to allow for more fluid to flow from the fluid supply 414 so as to increase the fluid pressure.

In some embodiments, the controller 434 may include a global positioning system sensor 440 (e.g., GPS, route information sensor, etc.) (hereinafter "GPS sensor"). The GPS sensor 440 is configured to sense the position of the system 400. In some embodiments, the GPS sensor 440 is configured to determine the geographical location of the system 400. In some embodiments, the GPS sensor 440 may determine the precise longitude and latitude coordinates for the system 400. In some embodiments, the controller 434 includes an antenna 442 (e.g., receiver, transponder, etc.). In some embodiments, the system 400 includes a remote server 446. Here, the antenna 442, through a wireless path 444, is wirelessly connected to a remote server 446. The remote server 446 is configured to receive the location of the system 400. In operation, the controller 434 through the processor 436 activates the GPS sensor 440. The GPS sensor 440 detects the location of the system 400 and transmits the location to the processor 436. The processor 436 transmits the location to the antenna 442. The antenna 442 transmits the location through the wireless path 444 to the remote server 446. The remote server 446 receives the location of the system 400. In some embodiments, the remote server 446 may have a display which displays the location of the system 400 to a user. In some embodiments, the remote server 446 may transmit the location to one or more user devices (e.g., a mobile phone, a tablet, a remote server, etc.).

In some embodiments, the controller 434 includes communications functionality to permit one- or two-way communication with at least one other device. For example, the controller 434 may report information, such as conditions of the system 400 or organ 402 (e.g., pressure and temperature), to another device using any suitable method, e.g., cellular communications, Wi-Fi, or Bluetooth. The information can be relayed to the device using intermediate devices, e.g., servers. In some embodiments, the device can be used to send commands or instructions to the controller, such as instructions to change temperature or pressure. In this way, the conditions of the system 400 or more specifically the organ 402 can be monitored and/or controlled during transport. The system 400 can include a computer interface for monitoring and/or adjusting the conditions of the organ 402, such as by using a laptop or mobile device, e.g., mobile phone or tablet. In some embodiments the system 400 is configured to turn off certain wireless transmission (e.g. cellular, etc.) when above a certain speed (e.g. 130 mph) and resume when the speed of the device drops below the certain speed in order to comply with restrictions on wireless transmission during flight.

Figure 5:
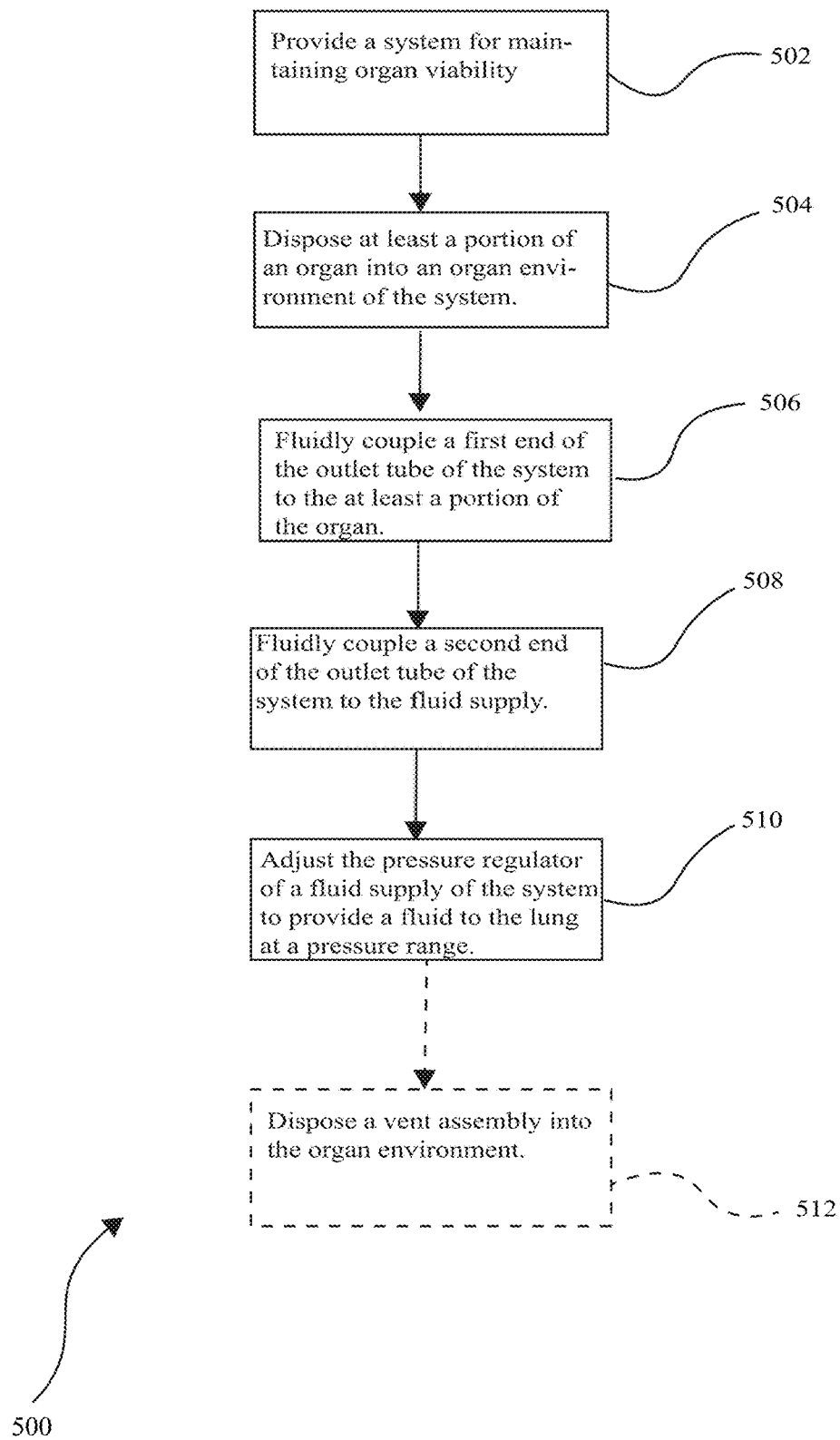
FIG. 5 illustrates a flow chart depicting the process for maintaining organ viability, according to an embodiment

Referring to FIG. 5, a flow chart depicts the method 500 of maintaining organ viability, according to an embodiment. At operation 502, a system for maintaining the organ viability is provided. The system includes a fluid supply configured to store a volume of a fluid, an outlet tube configured to be fluidly coupled to the fluid supply, a pressure regulator fluidly coupled to the outlet tube, a pressure valve fluidly coupled to the outlet tube, and a vent assembly including a vent tube configured to be disposed within an organ environment and a vent valve configured to be dispose outside of the organ environment. In some embodiments, the system may include a pressure gauge which is fluidly coupled to the outlet tube. In some embodiments, the system may include the system 100, 200, 300, 400, or any other system described herein.

At 504, at least a portion of an organ is disposed within an organ environment. In some embodiments, the organ environment may include at least one organ bag including an organ stabilizing medium. In some embodiments, the organ environment may include more than one organ bag. At 506, a first end of the outlet tube of the system is fluidly coupled to at least a portion of the organ. In some embodiments, the outlet tube may be connected to organ connector assembly which fluidly connects to at least the portion of the organ.

At 508, a second end of the outlet tube is fluidly connected to the fluid supply. At 510, a pressure regulator is adjusted so as to facilitate flow of the fluid from the fluid supply to at least a portion of the organ. Specifically, the pressure regulator is set to a pressure threshold such that if the fluid within the outlet tube exceeds the pressure threshold, the pressure regulator is configured to facilitate the flow of fluid from the outlet tube to the environment. In some embodiments, the pressure of the fluid in the outlet tube after the pressure regulator may increase due to the surrounding environment. Here, the pressure valve included in the system facilitates for the removal of the excess fluid so as to stabilize the pressure within outlet tube.

In some embodiments, the method 500, at 512, also includes disposing a vent assembly into the organ environment. The vent assembly is configured to stabilize the fluid pressure within the organ environment. Specifically, the vent assembly may include a vent tube which is disposed within the organ environment. Additionally, the vent assembly may include vent valve which is fluidly coupled to the vent tube and configured to release excess fluid within the organ environment to the surrounding environment via the vent tube.

Figure 6:
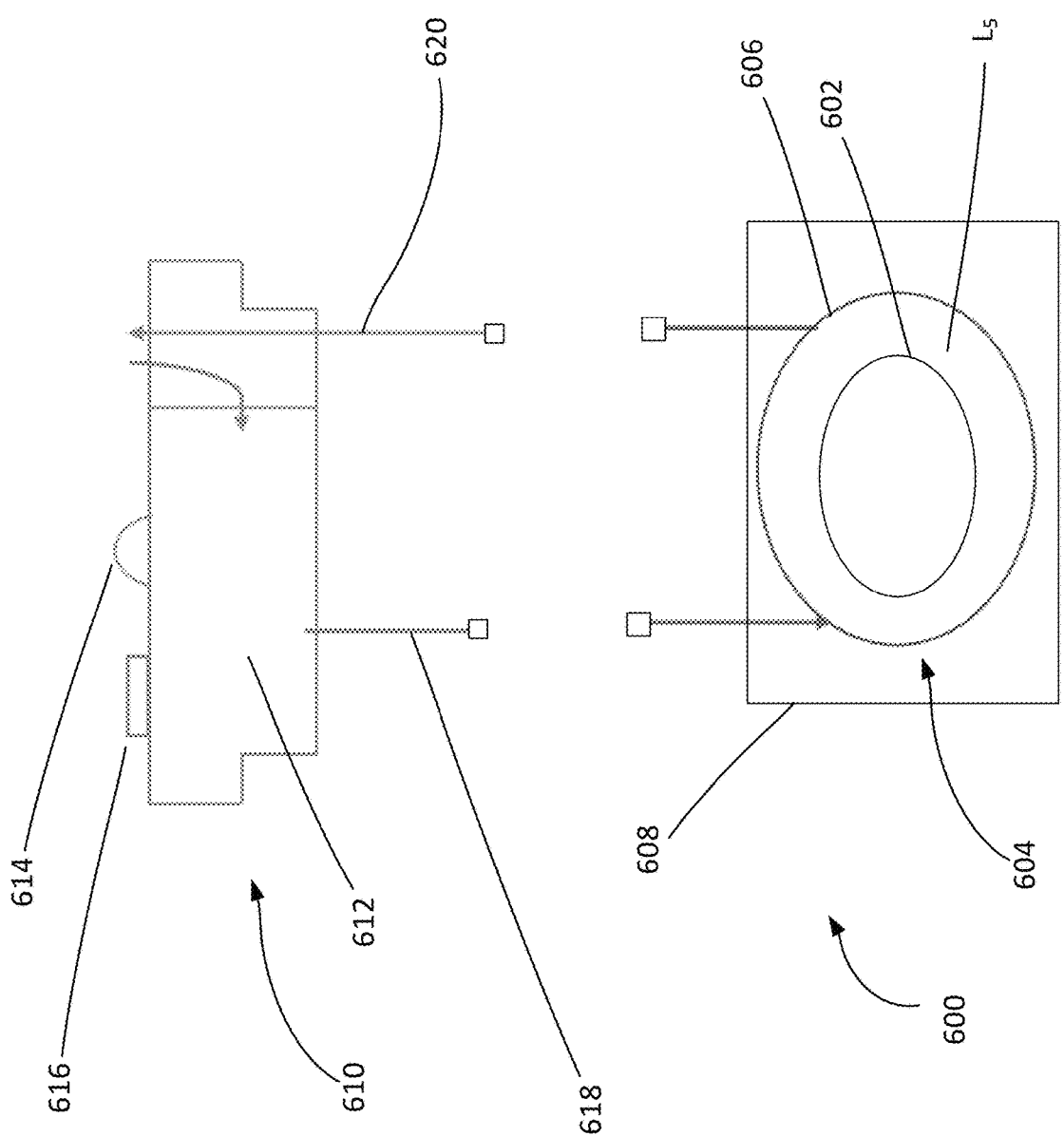
FIG. 6 illustrates a schematic illustration of an example system, according to an embodiment.
Figure 7:
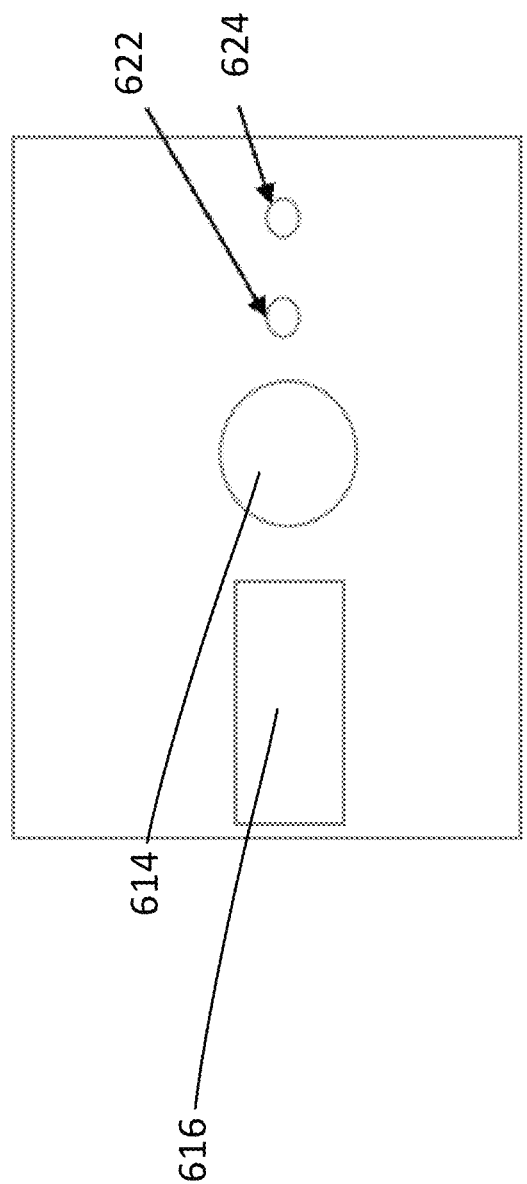
FIG. 7 illustrates a schematic illustration of the example system of FIG. 6.
Figure 8:
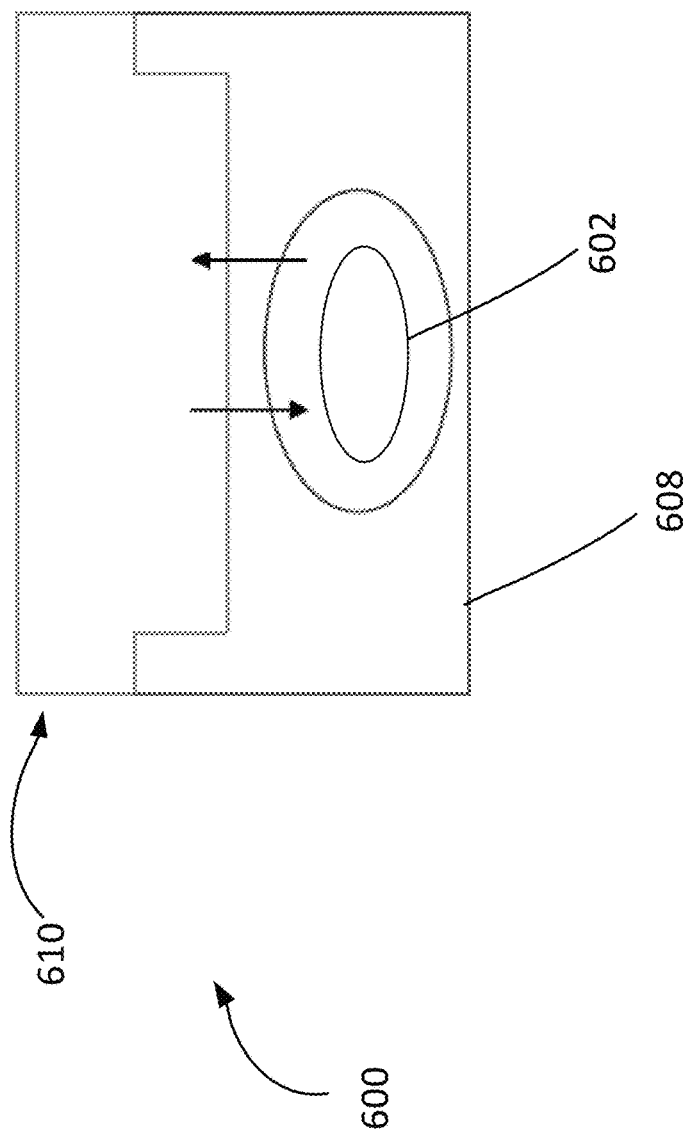
FIG. 8 illustrates a schematic illustration of the example system of FIG. 6.

Referring to FIG. 6-8, a schematic illustration of a system 600 is depicted. The system 600 includes an organ 602 disposed within an organ stabilizing fluid $L_5$ and an organ environment 606 including at least one organ bag 606. In some embodiments, the organ environment 606 include more than one organ bag 606. The organ environment system 606 includes a transport container 608. The transport container 608, the at least one organ bag 606, the organ stabilizing fluid $L_5$, the organ environment 604, and the organ 602 is substantially similar to the transport container 313, the at least one organ bag 102, the organ stabilizing fluid $L_1$, the organ environment 104, and the organ 102, and therefore not described in further detail.

The system 600 includes a controller 610 (e.g., control circuit, programmable logic board, driver, etc.). The controller 610 may be coupled to the transport container 608.

The controller 610 is substantially similar to the controller 434. The controller 610 is coupled to a fluid condenser 612, a pressure gauge 614, a pressure controller 616, a fluid input line 618, a fluid supply line 620, a fluid valve 622, and a vent valve 624. The pressure gauge 614 is substantially similar to the pressure gauge 219 and therefore not described in further detail. In some embodiments, the fluid condenser 612 is similar to the fluid supply 114 where the fluid supply 114 is a gas condenser.

In operation, the pressure controller 616 is operated to provide the organ 602 a fluid. The pressure controller 616 operates the fluid valve 622 such that fluid (e.g., ambient air, oxygen, etc.) from the surrounding atmosphere flows through the fluid valve 622 and to the fluid condenser 612. Consequently, the pressure controller 616 may control the pressure of the fluid surrounding the organ 602. As the fluid condenser 612 (e.g., oxygen condenser, gas condenser, etc.) condenses (e.g., removes nitrogen, removes carbon dioxide, removes neon, removes hydrogen, etc.) the fluid and provides the condensed fluid to the fluid input line 618. In an example embodiment, the fluid condenser 612 receives the fluid from the fluid valve 624 and filters out the nitrogen such that the fluid is primarily oxygen. In some embodiments, the fluid condenser 612 may combine the fluid flowing through the fluid valve 622 with a fluid from a fluid supply (e.g., fluid supply 114, fluid supply 214, fluid supply 314, fluid supply 414, etc.). The fluid flows through the fluid supply line 618 into the organ 602 such that the organ 602 may be in a desired state (e.g., inflated, etc.). As the organ 602 is maintained in the desired state, excess fluid flows through the vent supply line 620, through the vent valve 624 and into the atmosphere.

The term "coupled" and the like, as used herein, mean the joining of two components directly or indirectly to one another. Such joining may be stationary (e.g., permanent) or moveable (e.g., removable or releasable). Such joining may be achieved with the two components, or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, gas, liquid, may flow, either with or without intervening components or objects.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A method, comprising:
   providing a system, comprising:
      an organ environment;
      a gas supply configured to store a volume of a gas,
      an outlet tube configured to be fluidly coupled to the gas supply,
      a pressure regulator fluidly coupled to the outlet tube,
      a pressure valve fluidly coupled to the outlet tube,
      a controller,
      a condenser coupled to the controller and fluidically coupled to the gas supply, and
      a vent assembly comprising:
         a vent tube configured to be disposed within an organ environment; and
         a vent valve configured to be disposed outside of the organ environment;
   disposing at least a portion of an organ into the organ environment;
   fluidly coupling a first end of the outlet tube to the organ environment;
   fluidly coupling a second end of the outlet tube to the gas fluid supply;
   adjusting the pressure regulator to provide the gas to the organ in the organ environment through the outlet tube at a gas pressure range above an ambient air pressure so as to maintain the at least a portion of the organ in an inflated position in the organ environment, and
   providing the gas to the condenser from the gas supply and condensing the gas.

2. The method of claim 1, wherein the system further comprises a pressure gauge fluidly coupled to the outlet tube, the pressure gauge configured to measure a gas pressure within the outlet tube.

3. The method of claim 1, further comprising:
   measuring, by the pressure gauge, a gas pressure value of the fluid in the outlet tube as it flows from the gas supply to the organ;
   stabilizing, by the pressure valve, the gas pressure in the outlet tube; and
   stabilizing, by the vent assembly, the gas pressure in the organ environment.

4. The method of claim 1, further comprising removing an excess of the gas from the organ environment.

5. The method of claim 1, wherein the organ is a lung.

6. The method of claim 5, wherein the gas provided to the organ in the organ environment has a pressure from 8 $cmH_2O$ to 20 $cmH_2O$ above the ambient air pressure.

7. The method of claim 5, wherein the gas provided to the organ in the organ environment has a pressure from 12 $cmH_2O$ to 15 $cmH_2O$ above the ambient air pressure.

8. The method of claim 5, wherein the system further comprises an organ connector tube coupled to a distal end of the outlet tube and to an inlet of the organ environment.

9. The method of claim 8, wherein the system further comprises an organ connector coupled to the organ connector tube and an inlet of the lung.

10. The method of claim 9, wherein the organ connector is coupled to a trachea of the lung or a mainstem bronchus of the lung.

11. The method of claim 5, wherein the organ environment comprises a first sterile bag, a second sterile bag and a third sterile bag, wherein the second sterile bag is inside the third sterile bag, the first sterile bag is inside the first sterile bag and the first sterile bag contains the lung and an organ stabilizing fluid.

12. The method of claim 1, wherein the method further comprises: receiving a gas pressure value from a user;
   adjusting the gas pressure in the organ environment at the gas pressure value received from the user; and
   storing the gas pressure value in a memory within the controller.

13. The method of claim 1, wherein the controller further comprises a global positioning system and an antenna, wherein the method further comprises determining a geographical location of the system by the global positioning system and transmitting the geographical location of the system to a remote location.

14. The method of claim 1, wherein said condensing comprises removing gases from the gas so that the condensed gas supplied from the condenser is primarily oxygen.

15. The method of claim 5, further comprising transporting the lung in the organ environment of the system.

* * * * *